June 11, 1935.  H. D. GUMPPER  2,004,404

SPEED GOVERNOR FOR GAS ELECTRIC POWER UNITS

Filed July 11, 1934  2 Sheets-Sheet 1

INVENTOR
Harold D. Gumpper,
BY
ATTORNEYS

June 11, 1935.                H. D. GUMPPER                  2,004,404
              SPEED GOVERNOR FOR GAS ELECTRIC POWER UNITS
                    Filed July 11, 1934           2 Sheets-Sheet 2
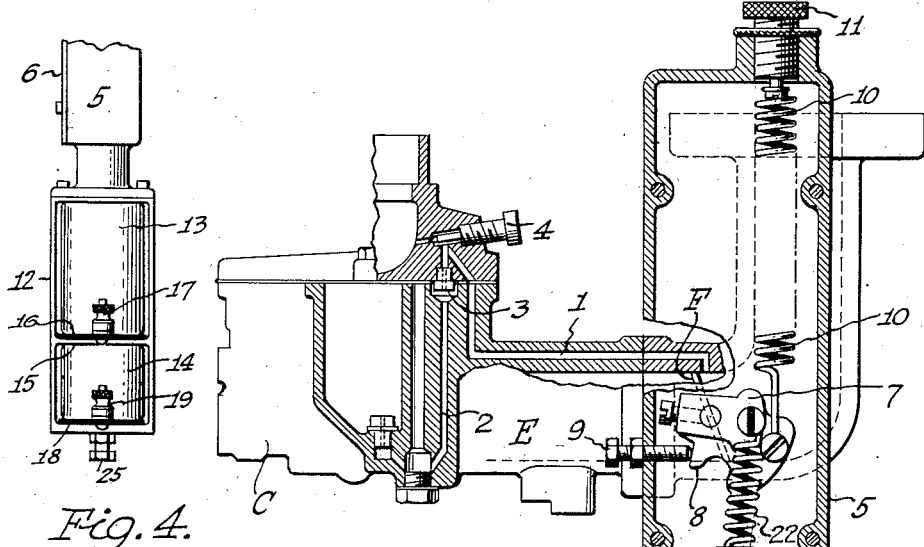
Fig. 4.
Fig. 3.
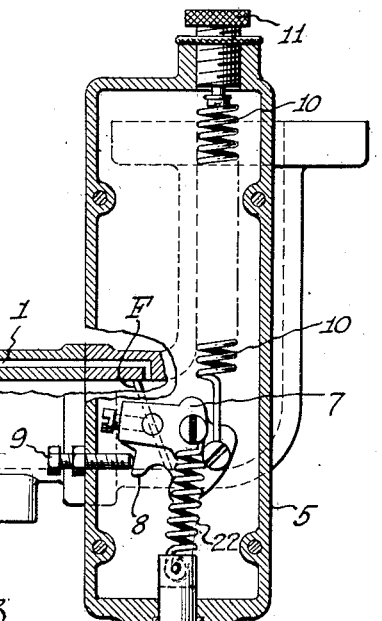
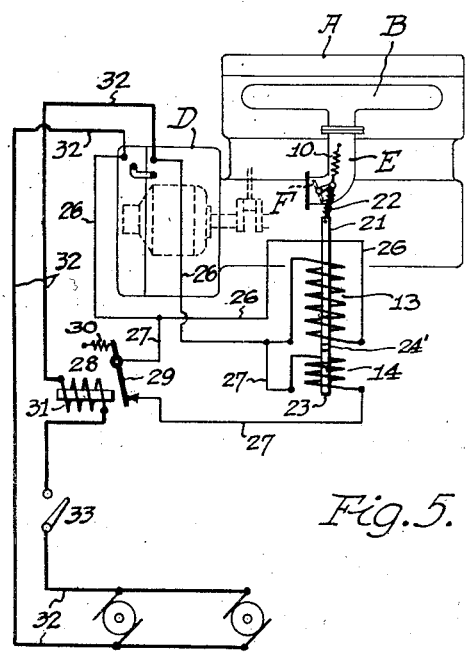
Fig. 5.
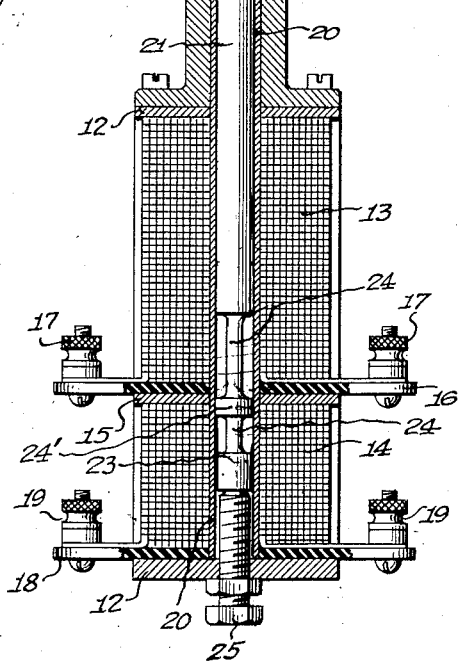
INVENTOR
Harold D. Gumpper,
BY
ATTORNEYS Patented June 11, 1935

2,004,404

UNITED STATES PATENT OFFICE 2,004,404

SPEED GOVERNOR FOR GAS-ELECTRIC POWER UNITS

Harold D. Gumpper, Detroit, Mich.

Application July 11, 1934, Serial No. 734,629

12 Claims. (Cl. 290—40)

This invention relates to means for controlling the speed of a prime mover driving an electric generator in such a manner that the voltage generated remains practically constant as the loads imposed on the generator vary and also as the load is removed the engine speed may be quickly reduced to a slow idling speed thereby saving wear on the prime mover and reducing fuel consumption at no loads to a minimum.

A further object of this invention is to accomplish these results by means of a simple electric throttling governor which controls the fluid, gas, steam, vapor, or fuel and air mixture admitted to the prime mover for driving same. The apparatus shown in the drawings is arranged primarily for use on an internal combustion engine operated on gasoline but the use and adaptation of the principles disclosed in this invention may be readily applied to any other type of prime mover driving an electric generator.

A further object of this invention is to provide means whereby the reduction of engine speed and generated voltage may be accomplished without momentary fluctuations and automatically as the external load is removed from the generator, and then automatically restored to normal without momentary fluctuations when a load is imposed on the generator, or whereby this control may be accomplished manually at the will of the operator or by a combination of the two methods.

It is also an object to provide a speed and voltage regulating device which is simple in construction, efficient in operation, and embodies certain other new and useful features in the construction and arrangement, all as hereinafter set forth, reference being had to the accompanying drawings in which:

Fig. 3 is an enlarged longitudinal vertical section through the control device and showing a carburetor partly broken away and in section, connected thereto;

Fig. 4 is a partial side elevation of the control device shown in Fig. 3 and showing the same detached and drawn to a reduced scale; and Fig. 5 is a diagrammatic view of the electrical hookup of the device.

Figure 2:
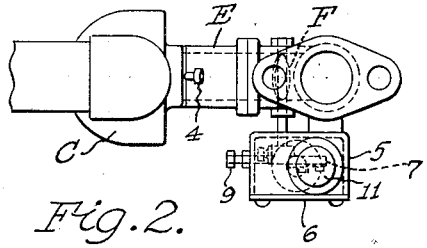
Fig. 2 is a plan view of the carburetor and control device connected thereto and shown in Fig. 1.
Figure 1:
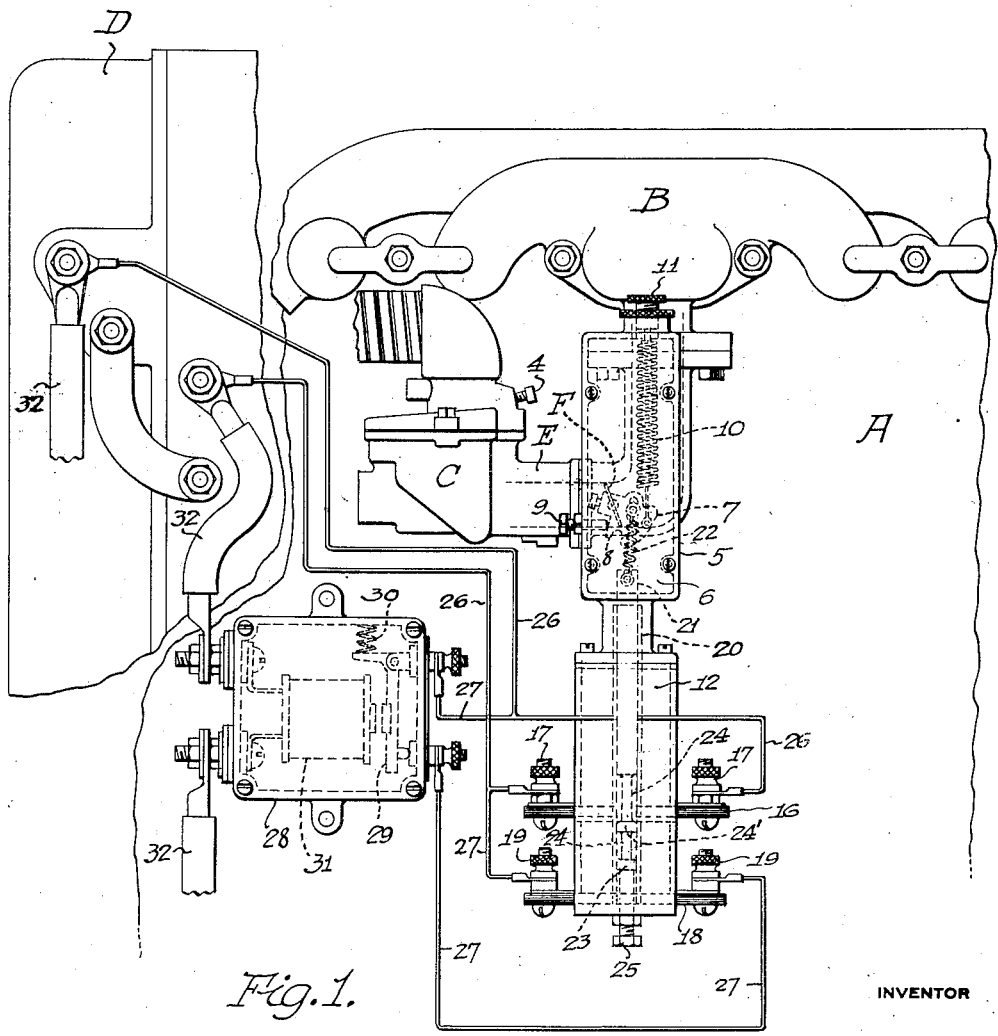
Figure 1 is a side elevation of a portion of an internal combustion engine and generator, illustrative of the application thereto, of a control device illustrative of an embodiment of the present invention and its electrical connections thereto.

As indicated in Figures 1, 3 and 5, A indicates a prime mover of the usual internal combustion engine type having an intake manifold B to which a carburetor C is connected in the usual manner, an electric generator D of any well known construction, being direct connected in the usual manner to the crankshaft of the engine. The carbureter C is provided with the usual mixture outlet pipe E bolted to the manifold B and within which pipe is the usual throttle valve F. Preferably, the carbureter is provided with an idling or low speed mixture supply passage 1 shown in Fig. 3, this passage opening into the main passage E just beyond the throttle F so that it is always open to supply mixture to the engine, and a fuel passage 2 is arranged to supply fuel through an idling jet 3 therein to the passage 1, and the mixture is adjusted for richness and smooth running of the engine at idling or low speeds, as when the throttle is closed or nearly so, by an air admission needle valve 4.

The speed governing and idling control device illustrative of an embodiment of the present invention, comprises a casing 5 having a front removable cover 6 and supported in vertical position alongside the outlet pipe E of the carbureter with the stem of the throttle F projecting into said casing where it is provided with a lever device 7 by means of which said throttle is turned. This lever 7 is formed with a stop shoulder 8 adapted to be engaged by an adjustable stop screw 9 carried by the casing 5 to limit the closing movement of said throttle, and pivotally attached to the free end of said lever arm 7, is the lower end of a coiled spring 10, the upper end of which is attached to an adjusting screw 11 mounted in the upper end wall of the casing, said spring normally tending to turn the throttle from closed position toward open position.

Secured to a downward extension on the lower end of casing 5, is a frame 12 of magnetic material for the support of a main solenoid coil 13 and an auxiliary solenoid coil 14, one below the other in axial alignment, said frame having a transverse partition 15 of magnetic material separating said solenoids and forming a support for an insulating plate 16, the ends of which are extended laterally to form supports for binding posts 17 to which the two terminals of the coil forming the solenoid 13 are attached and to which wires leading from said coil are secured. The coil 14 is supported in a like manner upon an insulating plate 18 the ends of which form supports for binding posts 19 to which the ends of the coil 14 are secured and from which lead wires extend. Mounted axially within said coils and extending therethrough, is a guide tube 20 formed of non-magnetic material within which tube a movable core member or plunger 21 for the coils 13 and 14, is free to move longitudinally, with its upper end extending into the casing 5 and connected to the lever 7 by means of an extensible spring link 22.

Adjacent its lower end, this plunger or core member is reduced in diameter, as at 24, above and below a collar or portion 24′ thereof of the same diameter as the body of the core, and a head portion 23 of like diameter, is provided at the extreme lower end of said core. During the normal working of the device, this core slides within the guide tube 20, with its collar 24' positioned adjacent said plate or partition 15, and mounted within a screwthreaded opening in the lower end wall of the frame 12 and extending upwardly within the lower end of the tube 20, is an adjustable abutment screw 25 to abut the lower end of plunger 21 or its head 23, and this screw is formed of a metal which becomes magnetized upon current flow through the coil 14, so that the electromagnet thus formed, will exert a force tending to hold said plunger in contact therewith or pulled down within said coil as long as said coil remains energized, thus holding through its yieldable connection 22 therewith, the throttle F in closed position with the arm 7 in contact with the stop screw 9. Low or idling speed of the engine is thus maintained and fluttering of the throttle prevented.

As illustrated in Fig. 5, the solenoid coil 13 is connected within a shunt circuit 26 across the terminals of the generator D, and the coil 14 of the auxiliary solenoid is connected within a shunt circuit 27 across said terminals. Within the shunt circuit 27 is connected a relay operated switch, indicated as a whole at 28 in Fig. 1, and embodying a switch arm 29 to bridge the terminals of the circuit 27 and normally held in closed position by a spring 30, said arm being swung to break the circuit, by means of a magnetic coil 31 connected within an external or power circuit 32 of the generator, this power circuit including a switch 33 by means of which said circuit may be opened or closed. This shunt circuit 27 may also be closed or opened by any other suitable means than the inclined relay 28.

In starting the engine from rest, there is no voltage to energize solenoid coils 13 and 14, and consequently there is no magnetic pull on plunger 21 and the throttle F is swung immediately to open position by the spring 10 connected to arm 7. Consequently the engine speed builds up rapidly until such time as voltage in the solenoid 13 and 14 exerts a magnetic pull against the spring 10 sufficient to turn said throttle toward closed position. When coil 14 is not energized by the shunt circuit 27, the throttle position, engine speed, and generated voltage is determined by the balance between the magnetic pull of coil 13 upon plunger 21 against the action of spring 10. Therefore the lower the voltage, the less solenoid pull and the greater the throttle opening, and the higher the voltage, the greater the solenoid pull and the less the throttle opening. This results in an electric governor action which closely regulates the engine speed in accordance with the generated voltage. However, in order to prevent surging or momentary fluctuations in voltage and consequent fluctuations in engine speed, it is necessary that a differential between no load and full load voltage be maintained so that no load voltage will ordinarily, be considerably higher than full load voltage.

The proper idling voltage to act upon said solenoids, at no loads, is secured by closing the circuit 27, either through the relay 28 shown, or through other suitable means, and this closing of said circuit 27 energizes coil 14, which creates a magnetic field and draws the lower end of plunger 21 into contact with the magnetic stop 25, setting up a magnetic seal which holds these parts in contact with said plunger moved down and the throttle closed, even through quite wide ranges of fluctuation in the magnetizing force, due to reduced voltage in coil 14. As plunger 21 is drawn down against magnetic stop 25 it exerts a pull upon spring link 22 and arm 7, closing the throttle valve F to idling position controlled by adjusting screw 9, and speed and voltage dependent upon the throttle opening is reduced. The plunger is released from this idling position by the breaking of the circuit through coil 14 by means of the relay 28 or by other means of opening said circuit, thus nullifying the magnetic effect of said coil and permitting the spring 10 to turn the throttle toward open position, such turning to wide open position being resisted by the magnetic pull of coil 13.

During normal running conditions, any variation in generator load, will vary the voltage which in turn will vary the magnetic pull of coil 13 on the plunger 21 and consequent throttle opening, thus maintaining a substantial balance between the pull of the spring 10 and the pull of coil 13 to vary the throttle opening and speed up the engine as the generator load increases and to reduce engine speed as generator load decreases, thus preventing engine racing and maintaining generator output voltage. Whenever the voltage varies, varying the pull on said plunger and consequent throttle opening, there will be more or less of a surge or variation before this pull of the coil 13 and opposed pull of spring 10 will come to an exact balance, this surge causing a fluttering movement of the throttle F, and to prevent this surge and consequent flutter, the collar 24' is provided on said plunger to move therewith in any suitable manner and act as a dampener to vary the magnetic reluctance of coil 13, this variation being secured through the movement of said collar into and out of alignment with the base plate 15 or path of the flux of said coil as the plunger is moved up or down.

The operation of relay 28 may be described as follows: The relay consists of an electric magnet coil 31 connected in series with the power circuit. As current flows through this coil 31 a magnetic armature 29 is drawn against the magnet poles which opens the contact points, interrupting the circuit 27 and automatically cutting out coil 14. Conversely, breaking the power circuit through coil 31 closes the contacts thereby closing the circuit 27 and energizing said coil. While this relay is required for making the device fully automatic in its idling operation in conjunction with the governor, it may be dispensed with where other means of closing the circuit 27 is provided.

Obviously changes may be made in the construction and arrangement of parts without departing from the spirit of the invention and I do not, therefore, limit myself to the particular construction shown.

Having thus fully described my invention, what I claim is:—

1. An electric governor for controlling the speed of a prime mover arranged to drive an electric generator connected with a main circuit, said governor including solenoids comprising coils and a movable core member, said coils being each connected in shunt across said main circuit, control means for varying the speed of said prime mover operatively connected to said core member, and electro-magnetic means for attracting said core and resisting movement of the same at low speeds of said prime mover and against the action of the energized coil, whereby limited variations in voltage at low speeds, will not effect a change in speed of said prime mover.

2. A device of the character described including two solenoids each comprising a coil and an axial movable core member, said solenoids being arranged, upon energization of their coils, to move said core member longitudinally in one direction, control means operatively connected to said core member for varying the speed of a prime mover, means for operating said control means in a direction opposite to that in which the same is operated by said core connected thereto, and means energized by current flow in one of said coils to resist movement of said core.

3. A device for controlling the speed of an engine having a throttle for controlling the speed of said engine, said engine being arranged to drive an electric generator connected within a circuit; said device including electrically operated throttle operating means connected in shunt across the generator circuit and adapted to operate to close said throttle, yieldable means to open said throttle against the action of said throttle operating means, and auxiliary electrically operated means connected in shunt across said generator circuit and operative to supplement the action of said throttle operating means in closing said throttle and energized by current flow to magnetically resist the opening of said throttle at lower engine speeds and low voltage.

4. A control device of the character described including coils arranged in longitudinal axial alignment, a core member moved in one direction by energization of said coils and operatively connected with a throttle of a prime mover, yieldable means for moving said core in an opposite direction, and means energized by current flow in one of said coils to resist movement of said core by said yieldable means.

5. A control device of the character described including a solenoid comprising a coil and a longitudinally movable core in said coil, means for operatively connecting said core with a throttle of a prime mover for driving an electric generator, and dampening means to vary the magnetic reluctance of said coil, movable with said core.

6. A control device of the character described including a solenoid comprising a coil and a longitudinally movable core in said coil, means for operatively connecting said core with a throttle of a prime mover, and dampening means to vary the magnetic reluctance of said coil comprising a member movable with said core within said coil across the path of the flux of said coil.

7. A control device of the character described including solenoids comprising coils supported in axial alignment and having a common longitudinally movable core, a means for operatively connecting a throttle of a prime mover and said core, a member extending across said coils therebetween to provide a flux path, and a member movable with said core across said flux path to vary the magnetic reluctance of the adjacent coil.

8. A control device of the character described including solenoids comprising a pair of coils supported in axial alignment and having a common longitudinally movable core provided with a collar movable with said core within one of said coils and into one end of said other coil across the flow of flux of said coil, means for operatively connecting a throttle of a prime mover and said core, and a magnetic abutment for the free end of said core and energized by current flow in said first named coil of said pair of coils.

9. A device for controlling the speed of a prime mover arranged to drive an electric generator connected within an external circuit, said device including two coils arranged in longitudinal axial alignment and each connected in shunt across said external circuit of said generator, a movable core member in said coils, said core member being operatively connected to control means for varying the speed of said prime mover to move the same in one direction, yieldable means for moving said control means in an opposite direction, and means connected within said external circuit of said generator for automatically breaking the shunt circuit of one of said coils upon the closing of said external circuit.

10. A device as characterized in claim 9 and including magnetically operating means within said coil the shunt circuit of which is broken by said automatic means, said magnetically operating means to be energized by current flow through said coil and operative at low voltage to resist movement of said core therein and the operation of said prime mover speed control means by said yieldable means.

11. A device for controlling the speed of an internal combustion engine having a throttle for controlling the supply of combustible charges to said engine, said engine being arranged to drive an electric generator connected within a main circuit; said device including a solenoid comprising a coil and a movable core member, said core member being operatively connected to said throttle, an auxiliary solenoid arranged in longitudinal axial alignment with said first named solenoid and including a coil with said core member movable therein, said coils being connected in shunt across the main circuit of said generator for simultaneous energization, an adjustable abutment for said core member, said abutment being magnetized by current flow in said coil of said auxiliary solenoid to resist movement of said core away from said abutment, and means for breaking the circuit of said auxiliary solenoid.

12. A device for controlling the speed of an internal combustion engine by current output of an electric generator driven by said engine and connected within a main circuit, said engine being provided with control means for varying the speed of said engine; said device comprising a casing, a lever in said casing operatively connected to said control means, a spring in said casing tending to normally hold said control means in open position, a main and an auxiliary solenoid suspended from the lower end of said casing in axial alignment and each comprising a coil and a common movable core, said core extending at its upper end into said casing and yieldably and operatively connected to said lever, said coils of said solenoids being connected in shunt across the main circuit of said generator, an adjustable abutment member extending into said coil of said auxiliary solenoid to oppose the end of said core and adapted to be magnetized by current of low voltage passing through said coil, a switch in the shunt circuit of said auxiliary solenoid, and a relay in an external circuit of said generator for opening said switch upon closing of said external circuit.

HAROLD D. GUMPPER.